United States Patent
Sundborger (10) Patent No.: US 8,087,382 B2
(45) Date of Patent: Jan. 3, 2012

(54) METHOD AND ARRANGEMENT FOR ANIMAL MANAGEMENT

(75) Inventor: Helene Sundborger, Grödinge (SE)

(73) Assignee: DeLaval Holding AB, Tumba (SE)

( * ) Notice: Subject to any disclaimer, the term of this patent is extended or adjusted under 35 U.S.C. 154(b) by 126 days.

(21) Appl. No.: 12/452,214

(22) PCT Filed: Jun. 23, 2008

(86) PCT No.: PCT/SE2008/050744
§ 371 (c)(1),
(2), (4) Date: Dec. 22, 2009

(87) PCT Pub. No.: WO2009/002258
PCT Pub. Date: Dec. 31, 2008

(65) Prior Publication Data
US 2010/0116211 A1    May 13, 2010

(30) Foreign Application Priority Data
Jun. 25, 2007  (SE) .................................... 0701532

(51) Int. Cl.
*A01J 5/007*    (2006.01)
(52) U.S. Cl. ................. 119/14.02; 119/14.14; 119/14.18
(58) Field of Classification Search ............... 119/14.01, 119/14.02, 14.03, 14.08, 14.14, 14.18, 843
See application file for complete search history.

(56) References Cited

U.S. PATENT DOCUMENTS

| | | | |
|---|---|---|---|
| 5,782,199 A | 7/1998 | Oosterling | |
| 6,209,485 B1 | 4/2001 | Van der Lely | |
| 6,394,028 B1 | 5/2002 | Birk | |
| 6,571,730 B1 | 6/2003 | Norberg | |
| 7,047,008 B2 | 5/2006 | Martlew | |
| 7,296,535 B2 | 11/2007 | Ornerfors | |
| 7,874,263 B2 * | 1/2011 | Schulte | 119/14.02 |
| 2001/0042515 A1 * | 11/2001 | Gallagher et al. | 119/14.03 |

(Continued)

FOREIGN PATENT DOCUMENTS

EP    0764403    3/1997

(Continued)

OTHER PUBLICATIONS

International Search Report.

(Continued)

*Primary Examiner* — T. Nguyen
(74) *Attorney, Agent, or Firm* — Young & Thompson (57) ABSTRACT

A method is provided for managing animals (10) in a milking system which comprises a milking stall (11) provided with a milking apparatus (13) for milking the animals, a gate arrangement (18a-b; 18a-b, 32; 55a-b) allowing the animals to enter said milking stall, one at a time, from at least two different locations, and a control device (15) which holds and updates a milking suitability index for each of the animals. According to the method a first animal is identified and received at a first location, and a milking suitability index for the first animal is retrieved. A second animal is identified and received at a second location, and a milking suitability index for the second animal is retrieved. The milking suitability indexes for the first and second animals are compared and an animal at either one of said first and second locations is allowed to enter the milking stall depending on the outcome of the comparison.

14 Claims, 3 Drawing Sheets

U.S. PATENT DOCUMENTS

| | | |
|---|---|---|
| 2002/0185070 A1 | 12/2002 | Espada Aventin |
| 2003/0172876 A1 | 9/2003 | Ornerfors |
| 2004/0235476 A1 | 11/2004 | Martlew |
| 2005/0223997 A1* | 10/2005 | Umegard .................... 119/14.03 |
| 2007/0209594 A1* | 9/2007 | Kaever et al. .............. 119/14.02 |
| 2008/0257265 A1* | 10/2008 | Borsen ....................... 119/14.02 |
| 2008/0282985 A1* | 11/2008 | Schulte ...................... 119/14.02 |
| 2009/0272325 A1* | 11/2009 | Sogaard et al. ............. 119/14.02 |
| 2010/0180824 A1* | 7/2010 | Bright et al. ................ 119/14.08 |
| 2010/0282172 A1* | 11/2010 | Eriksson et al. ........... 119/14.02 |

FOREIGN PATENT DOCUMENTS

| | | |
|---|---|---|
| EP | 0988784 | 3/2000 |
| EP | 1264536 | 12/2002 |
| WO | WO 01/17339 | 3/2001 |
| WO | WO 01/93666 | 12/2001 |
| WO | WO 03/086058 | 10/2003 |

OTHER PUBLICATIONS

International Preliminary Report on Patentability and Written Opinion dated Jan. 14, 2010 for corresponding International Application No. PCT/SE2008/050744.

* cited by examiner

METHOD AND ARRANGEMENT FOR ANIMAL MANAGEMENT

TECHNICAL FIELD OF THE INVENTION

The present invention relates to a method and an arrangement for animal management in a milking system.

DESCRIPTION OF RELATED ART AND BACKGROUND OF THE INVENTION

In modern dairy farm industry there are continuous research and development activities in order to improve the efficiency of various activities such as machine milking, which, inter alia, involve increased milk yield and reduced milking time.

A major trend in this respect is an increased degree of automation of the various activities. For instance, machine milking may be performed by milking robots in a completely automated manner. Such an automatic milking system may take care of milking, feeding, milk inspection, milk sampling, animal traffic, etc. in a large area wherein the dairy animals are walking about freely and are visiting the milking machine voluntarily.

A milking machine involves heavy expenditure and has a limited milk production capacity. Thus, animals having a high milk production should be allowed to be milked more often than animals having a low milk production. The operation and use of a milking machine, which animals are visiting on a voluntary basis, in order to obtain an optimum overall dairy farm performance is an arduous task. An objective is here to safeguard an optimum milk production. Naturally, ethical aspects as well as animal care have to be considered.

EP 0988784 E1 (MAASLAND) discloses a method of automatically milking animals, which are allowed to visit individually a milking parlor comprising a milking robot and an animal identification system. An animal visiting the milking parlor is milked only if at least a specific number of milkings, Q, of other animals has taken place since the last milking of the relevant animal. The number Q is calculated as $Q=cM/x$, where x is an individual animal parameter indicating how often the relevant animal has to be milked (a high figure for an animal having a high milk production). M is the total number of milkings performed by the robot, and c is a correction factor (between 0.5 and 1), which corrects for the fact that an animal only visits the robot a limited number of times per time unit.

WO 0193666 (DELAVAL) discloses a method of automatically milking animals which are allowed to move freely in an area intended therefore and to visit individually a milking parlor comprising a milking robot and an animal identification system. The method comprises dynamically assigning a milking qualification parameter to each of the animals that are allowed to move freely in the area, the respective milking qualification parameter indicating the degree of suitability that the respective animal, to which the milking qualification parameter is assigned, shall be milked; dynamically ranking the animals in accordance with their respective milking qualification parameters; and milking an animal during a visit to the milking parlor only if the animal is identified as belonging to the X highest ranked animals, i.e. the X animals that are best suited to be milked from a milk production optimization viewpoint, X being a positive integer.

SUMMARY OF THE INVENTION

While the above prior art documents disclose various milking decision algorithms they fail to disclose an active manner of guiding animals with higher milking priority past animals with lower milking priority, but which still are qualified for milking.

It is therefore an object of the present invention to provide a method and an arrangement for animal management, by which the above mentioned limitation is overcome.

It is in this respect a particular object of the invention to provide such method and arrangement, which are capable of arranging animals in a suitable order and allowing them to enter a milking stall in this order.

It is a further object of the invention to provide such method and arrangement, which improve the efficiency of the milking system to achieve an optimum milk production, simultaneously as the animal treatment is improved.

It is still a further object of the invention to provide such method and arrangement, which are accurate, efficient, and reliable, of reasonably low cost, and easy to implement.

These objects, among others, are attained by the methods and the arrangement as defined in the appended patent claims.

According to a first aspect of the invention there is provided a method for managing animals in a milking system which comprises a milking stall provided with a milking apparatus for milking the animals, a gate arrangement allowing the animals to enter the milking stall, one at a time, from at least two different locations, and a control device which holds and updates a milking suitability index for each of the animals. According to the method a first animal is identified and received at a first location, and a milking suitability index for the first animal is retrieved. A second animal is identified and received at a second location, and a milking suitability index for the second animal is retrieved. The milking suitability indexes for the first and second animals are compared and an animal at either one of the first and second locations is allowed to enter the milking stall depending on the outcome of the comparison.

Various embodiments are disclosed in the dependent claims.

The first and second locations may be locations in different booths, passage ways and/or waiting areas.

By means of the above-identified method an automatic manner of guiding animals to the milking stall in a selectable order is achieved to thereby increase milk production efficiency and improve animal care. The invention does not only suggest an order, in which the animals should preferably be milked, it also provides means to perform the milking in an order which is similar thereto, or at least which more resembles the optimum order than prior art milking methods. The invention is preferably implemented in a milking system comprising an automatic or voluntary milking station, which the animals may visit in a voluntary manner to be automatically managed and milked.

According to a second aspect of the invention there is provided an arrangement for management of animals in a milking system which comprises a milking stall provided with a milking apparatus for milking the animals, and a control device which holds and updates a milking suitability index for each of the animals. The arrangement comprises an animal identification arrangement operatively connected to the control device and provided for identifying a first and a second animal, a first and a second enclosed location, each leading to the milking stall and each housing one of the first and second animals, and a gate arrangement for allowing the animals to enter the milking stall, one at a time, from the first and second enclosed locations. The control device comprises means for (i) retrieving a milking suitability index for the first animal and a milking suitability index for the second animal; (ii) comparing the milking suitability indexes for the first and second animals; and (iii) controlling the gate arrangement to allow the first animal or the second animal to enter the milking stall depending on the outcome of the comparison.

According to yet a further aspect of the invention there is provided a method for managing animals in a milking system which comprises a milking stall provided with a milking apparatus for milking the animals, a waiting area from which animals are capable of entering the milking stall, and a control device which holds and updates a milking suitability index for each of the animals. According to the method an animal is identified at an entrance to the waiting area, a milking suitability index for the animal is retrieved, and the animal is allowed to enter the waiting area if the milking suitability index for the animal fulfills a first criterion. If the milking suitability index for an animal present in the waiting area fulfills a second criterion, the first criterion is made more severe at least until the animal having the milking suitability index that fulfills the second criterion has entered the milking stall.

Hereby it can be ensured that if an animal present in the waiting area has a very high milking priority, the criterion for new animals that want to enter the waiting area is increased considerably to reduce competition in the waiting area, thus allowing the animal with the very high milking priority to be admitted to the milking stall faster.

According to still a further aspect of the invention there is provided an arrangement for performing the above-identified method, wherein the arrangement comprises the control device and an animal identification arrangement.

Further characteristics of the invention, and advantages thereof, will be evident from the detailed description of embodiments of the present invention given hereinafter and the accompanying FIGS. 1-5, which are given by way of illustration only, and thus are not limitative of the present invention.

In the following detailed description the animals are cows. However, the invention is not limited to cows, but is applicable to any animals having the capability of producing milk, such as sheep, goats, buffaloes, horses, etc.

DETAILED DESCRIPTION OF EMBODIMENTS

Figure 1:
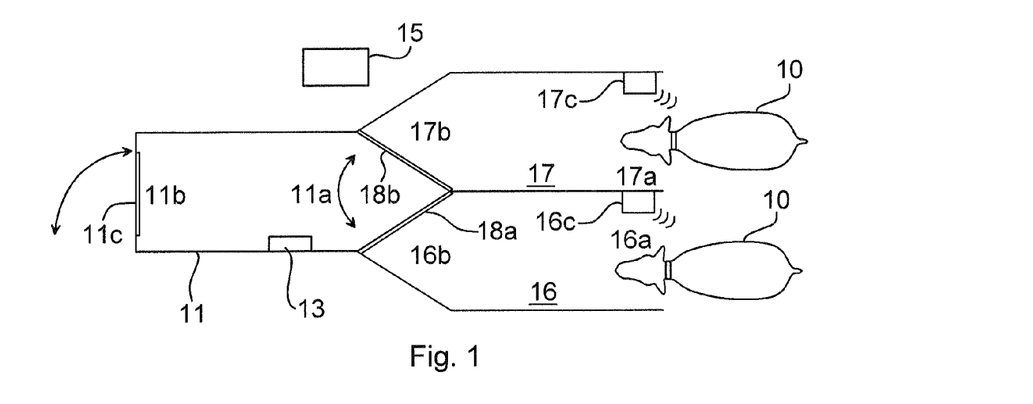
FIGS. 1-5 illustrate each schematically, in a top view, main components of a milking system, which comprises an arrangement for cow management according to a respective embodiment of the present invention.

FIG. 1 illustrates a milking system for milking a herd of cows 10 according to an embodiment of the invention. The milking system, which preferably is an automated milking system for voluntary milking, comprises a milking stall 11 provided with an entrance 11a, an exit 11b and an exit gate arrangement 11c. A milking apparatus 11 is provided for milking a cow present in the milking stall 11 and may comprise a milking machine and a milking robot for application of teat cups of the milking machine to the teats of a cow present in the milking stall 11. By the term milking stall as used herein is meant a location or position, to which the cows walk in order to be milked independently of the nature of the milking system. The invention is usable in a large variety of milking stalls including automatic milking systems, semi-automatic milking systems such as rotary platform based milking systems, and milking systems for group wise milking such as those having parallel stall or Herringbone configurations.

A control device 15 is provided for the overall control of the milking system, which includes e.g. control of the opening and closing of the exit gate arrangement 11c, the operation of the milking apparatus 13, etc. The control device 15 comprises typically a microcomputer, suitable software, and a database including information of each of the cows milked in the milking system, such as e.g. when the respective cow was milked last time, when the cow was fed last time, the milk production of the cow, the health of the cow, etc. Particularly, the control device 15 is arranged to hold and update a milking suitability index for each of the cows milked in the milking system.

Further, the milking system comprises a first 16 and a second 17 booth, each being provided with an entrance 16a, 17a, an exit 16b, 17b, and a cow identification device 16c, 17c. The exits 16b, 17b of the booths 16, 17 are in communication with the entrance 11a of the milking stall 11 to allow a cow in any of the booths 16, 17 to leave the booth 16, 17 through the exit 16b, 17b thereof to thereby enter the milking stall 11. The cow identification device 16c, 17c of each booth 16, 17 may be arranged in the booth 16, 17 or near the entrance 16a, 17a to the booth 16, 17 and is operatively connected to the control device 15.

Still further, a gate arrangement 18a-b is provided at the exits 16b, 17b of the booths 16, 17, the control of which being provided by the control device 15. The gate arrangement 18a-b allows cows to enter the milking stall 11, one at a time, from either one of the two booths 16, 17. In a non-illustrated version, the gate arrangement 18a-b may comprise a single gate that can be arranged in one state, in which the first booth 16 is open towards the milking stall 11, whereas the second booth 17 is closed, and in another state, in which the second booth 17 is open towards the milking stall 11, whereas the first booth 16 is closed. However such simple solution may not be practical since a cow in the milking stall 11 may be disturbed by a cow eager to enter the milking stall and which is not prevented to do so by the gate. More preferably, the gate arrangement 18a-b comprises, as illustrated, two gates that can be operated independently of one another so that both booths 16, 17 can be closed simultaneously.

The operation of the milking system is as follows. One cow 10 may enter the first booth 16 and one cow 10 may enter the second booth 17, and both cows 10 are identified in the booths 16, 17 or as they enter the booths 16, 17. The identifications are transferred to the control device 15, which retrieves the milking suitability indexes for the two cows. Each cow has a milking suitability index, which indicates in some sense the instant suitability of milking the cow. For sake of simplicity, it is assumed that a higher milking suitability index for a cow means a higher suitability to milk that cow. The milking suitability indexes for the cows may be updated intermittently, regularly, or continuously.

Milking permission as commonly used in the art may be given to a cow that has a milking suitability index above a threshold called milking permission threshold.

Assuming now that both cows in the booths 16, 17 has milking suitability index above the milking permission threshold, one could according to prior art allow any of the cows to enter the milking stall 11 to be milked therein. According to the present embodiment of the invention, however, the milking suitability indexes for the two cows are compared, and, depending on the outcome of the comparison, either one of the two cows is allowed to enter the milking stall 11 by operating the gate arrangement 18a-b properly. That is, the cow having the highest milking suitability index is allowed to enter the milking stall 11, whereas the other cow has to wait further.

If no new cow enters the emptied booth, while the cow in the milking stall 11 is being milked, the cow waiting in the other booth will, of course, be allowed to enter the milking stall 11 as soon as it is emptied.

If a new cow enters the emptied booth the milking suitability index is retrieved for this cow and is compared with the milking suitability index for the cow present in the other booth, and the cow having the highest milking suitability index of the two cows in the booths is allowed to enter the milking stall 11, whereas the other cow has to wait further.

In order to not have a cow waiting too long in a booth since this may be stressful or otherwise negatively experienced by a cow, the milking suitability indexes may be affected, i.e. raised, by the waiting time in one of the booths 16, 17. This updating of a milking suitability index may be made in a number of manners, which will not be discussed further herein, but in one version the milking suitability index for a cow waiting in one of the booths 16, 17 is not changed until a given number of times a cow in the other booth has been allowed to enter the milking stall 11, and at this instant the milking suitability index for the waiting cow is increased momentarily to such high level that the waiting cow will be next cow that is allowed to enter the milking stall 11 (i.e. independently on the milking suitability index for a cow that enters the other booth).

If one of the cows in the booths 16, 17 does not have a milking suitability index above the milking permission threshold it is not allowed to be milked. In the illustrated embodiment this is handled by opening gate arrangements 18a-b and 11c of the booth housing the cow and of the milking stall 11 to allow the cow to walk trough the milking stall without being milked. This can be made momentarily or it may be delayed e.g. depending on the milking suitability index for the cow in the other booth. If the cow in the other booth is highly suitable to be milked, i.e. it has a milking suitability index above a threshold called highly suitable threshold, which is higher than the milking permission threshold, this cow may be allowed to enter the milking stall 11 to be milked therein before the cow that should be allowed to walk trough the milking stall without being milked is allowed to do so.

By the embodiment of FIG. 1 the traffic of cows to the milking stall 11 may be controlled in order to give higher milking priorities to cows that are highly suitable to be milked. The order, in which cows are milked, is improved in order to obtain a higher milk production and better animal care. Later in this text it will be described how the milking suitability indexes can be formed and updated.

Figure 2:
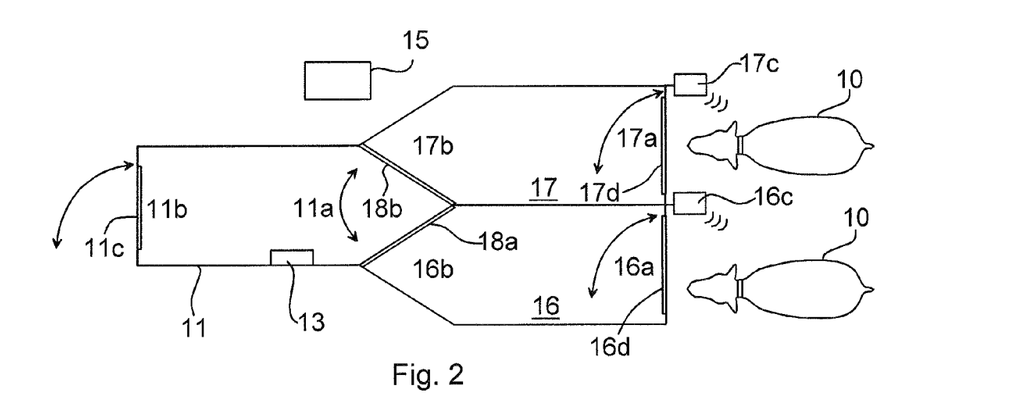

Turning next to FIG. 2, another embodiment of the invention differs from the embodiment of FIG. 1 in that the two booths 16, 17 are provided with entry gate arrangements 16d, 17d, the opening and closing of which being controlled by the control device 15. Further, the cow identification devices 16c, 17c are arranged so that cows in front of the booths 16, 17 are identified before they can enter the booths 16, 17.

Hereby, the measures, which have to be taken when a cow present in one of the booths has no milking permission, can be entirely avoided. A cow that has a milking suitability index which is below the milking permission threshold is simply not allowed to enter any of the booths 16, 17. In other respects, the operation of the embodiment of FIG. 2 does not differ from that of the embodiment of FIG. 1.

The above measures may also be avoided in a modified version of the FIG. 1 embodiment. In such modified version the two booths are located within a waiting area, which may house a plurality of cows, which have been identified at an entrance thereof, and which have been allowed to enter the waiting area after it has been confirmed that the cows have milking permission.

Figure 3:
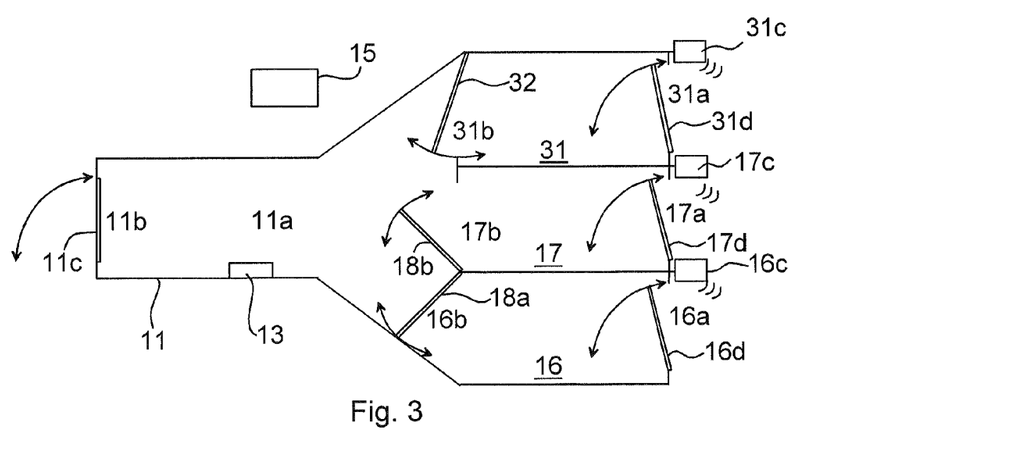

Turning next to FIG. 3, yet another embodiment of the invention differs from the embodiment of FIG. 2 in that a third booth 31 is provided adjacent booths 16, 17. The third booth is provided with an entrance 31a, an exit 31b, and a cow identification device 31c. The exit 31b of the third booth 31 is in communication with the entrance 11a of the milking stall 11 to allow a cow in the third booth 31 to leave the booth 31 through the exit 31b thereof to thereby enter the milking stall 11. A gate arrangement 32 is provided at the exit 31b of the third booth 31, the opening and closing of which being controlled by the control device 15. The cow identification device 31c of the third booth 31 is operatively connected to the control device 15 and is arranged so that a cow in front of the third booth 31 is identified before it can enter the third booth 31. Further, the third booth 31 is provided with an entry gate arrangement 31d, the opening and closing of which being controlled by the control device 15.

The operation of the embodiment of FIG. 3 differs from that of the embodiment of FIG. 2 in that the milking suitability index for a cow identified by the cow identification device 31c of the third booth 31 in front of the third booth 31 is retrieved and compared with the milking permission threshold and only if the milking suitability index is above the milking permission threshold, the cow is allowed to enter the third booth.

Next, when comparing the milking suitability indexes, the milking suitability indexes for the tree cows present in the three booths 16, 16, 31 are compared, and depending on the result of the comparison either one of the three cows is allowed to enter the milking stall 11 by operating the gate arrangements 18a-b, 32 properly. That is, the cow having the highest milking suitability index is allowed to enter the milking stall 11, whereas the other cows have to wait further.

If no new cow enters the emptied booth, the milking suitability indexes for the two remaining cows present in the booths 16, 16, 31 are compared, and the cow having the highest milking suitability index is allowed to enter the milking stall 11 by operating the gate arrangements 18a-b, 32 properly.

If no new cow enters any of the emptied booths, while the cow in the milking stall 11 is being milked, the cow waiting in the last booth will, of course, be allowed to enter the milking stall 11 as soon as it is emptied.

If a new cow enters any of the emptied booths the milking suitability index for this cow is compared with the milking suitability indexes for any other cows present in the other booths, and the cow having the highest milking suitability index of the cows present in the booths is allowed to enter the milking stall 11, whereas the other cows have to wait further.

In other aspects the operation of the embodiment of FIG. 3 is similar to that of the embodiment of FIG. 2.

It shall be appreciated to a person skilled in the art that while the FIG. 2 embodiment discloses two booths and the FIG. 3 embodiment discloses three booths, other embodiments of the invention may comprise more than three booths provided side by side. Similarly, the embodiment of FIG. 1 may be modified to comprise more than two booths. Naturally, the operation has to be modified to the number of booths used, but this should be readily made by a person skilled in the art after having read the present description.

It shall be pointed out that the more booths that are used, the more sophisticated and efficient milking may be performed since the order in which the cows are milked can be chosen more freely. However, costs and time for guiding cows may reduce the practical utility of a large number of booths.

Figure 4:
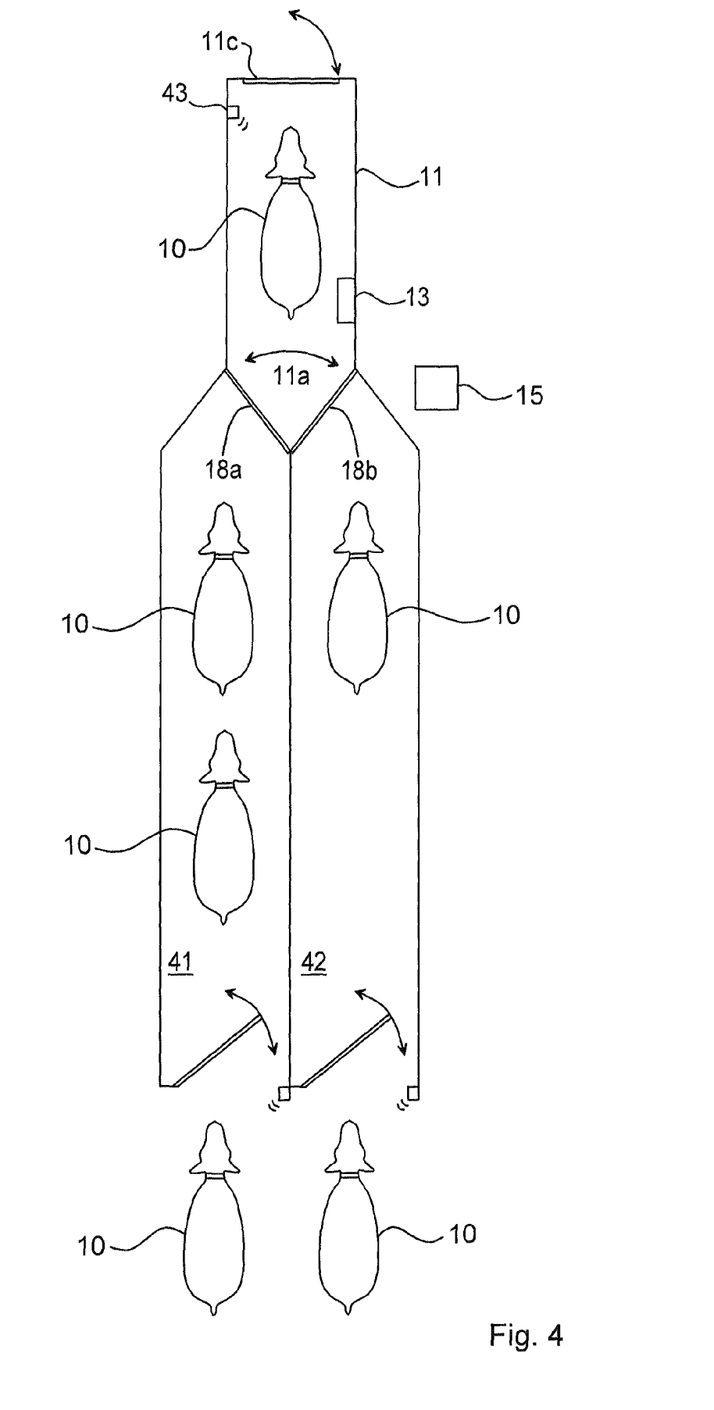

Turning next to FIG. 4, still another embodiment of the invention differs from the embodiment of FIG. 2 in that the first and second booths 16, 17 are exchanged for first and second passage ways 41, 42. Each of the passage ways 41, 42 may be narrow to prevent cows from passing each other therein, but long enough to house a plurality of cows. Hereby, the cows in each passage way 41, 42 have to be milked in the order, in which they entered the respective passage way 41, 42.

As in the FIG. 2 embodiment, the cows 10 are identified before being allowed to enter the passage ways and are only allowed to enter the passage ways 41, 42 if they have a milking suitability index above the milking permission threshold.

Various decision algorithms for deciding whether a cow from the first passage way 41 or from the second passage way 42 should be allowed to enter the milking stall 11 can be contemplated.

According to one decision algorithm the milking suitability indexes for the front cows in the passage ways 41, 42 are compared and the cow having the highest milking suitability index is allowed to enter the milking stall 11. A new comparison is made of the milking suitability indexes for the new front cows in the passage ways 41, 42 to decide which cow is next to be allowed entering the milking stall 11. However, this decision algorithm may not always be the best one, since a passage way may house cows that are very suitable to be milked behind a front cow having a relatively low milking suitability index.

Other decision algorithms compare the sum of the milking suitability indexes of the cows in one passage way with the sum of the milking suitability indexes of the cows in the other passage way, and the front cow in the passage way having the largest sum is allowed entering the milking stall as next cow. The sums may be weighted with higher weights for the milking suitability indexes of the front cows than for those of cows further back in the passage ways.

Yet another decision algorithm compares the milking suitability index of the cow having the highest milking suitability index of the cows in one passage way with the milking suitability index of the cow having the highest milking suitability index of the cows in the other passage way, and the front cow in the passage way housing the cow having the highest milking suitability index of the cows in the passage way is allowed entering the milking stall as next cow.

In an alternative version of the FIG. 4 embodiment, cows having a milking suitability index above the milking permission threshold but below a highly suitable threshold are only allowed to enter one of the passage ways 41, 42, whereas cows having a milking suitability index above the highly suitable threshold are allowed either to enter the other one of the passage ways 41, 42 or both passage ways 41, 42.

The decision algorithm for deciding whether a cow from the first passage way or from the second passage way should be allowed to enter the milking stall can be as above.

It shall be appreciated that in an alternative version of the embodiment of FIG. 4, the passage ways 41, 42 are wider so that cows can pass one another in the passage ways 41, 42. Hereby, it is not generally known the order in which the cows stand in the passage ways, and comparison of the milking suitability indexes of the front cows are generally not possible. Similarly, sums of milking suitability indexes with weights depending on the position of the cows cannot be calculated. However, in yet a modified version cow identification devices (not illustrated) may be provided in the front ends of the passage ways in order to at least identify the front cows in the passage ways 41, 42.

It shall further be appreciated that in each of the embodiments of FIGS. 2-4, the entry gates to the booths/passage ways and the cow identification devices may be exchanged for a single cow identification device and a selection gate arrangement operatively connected to the control device, wherein the cows are identified by the single cow identification device, after which each of the cows are guided to one of the booths/passage ways as selected by the control device provided that it has permission to be milked. The cows are thus identified in the respective booths/passage ways by means of the prior identification by the single cow identification device, the selection by the control device, and the guidance by the selection gate arrangement.

Such a version of the FIG. 4 embodiment is convenient since it can be used to select the passage way to which each cow should be guided for the purpose of collecting cows having different milking suitability indexes in the two passage ways.

Figure 5:
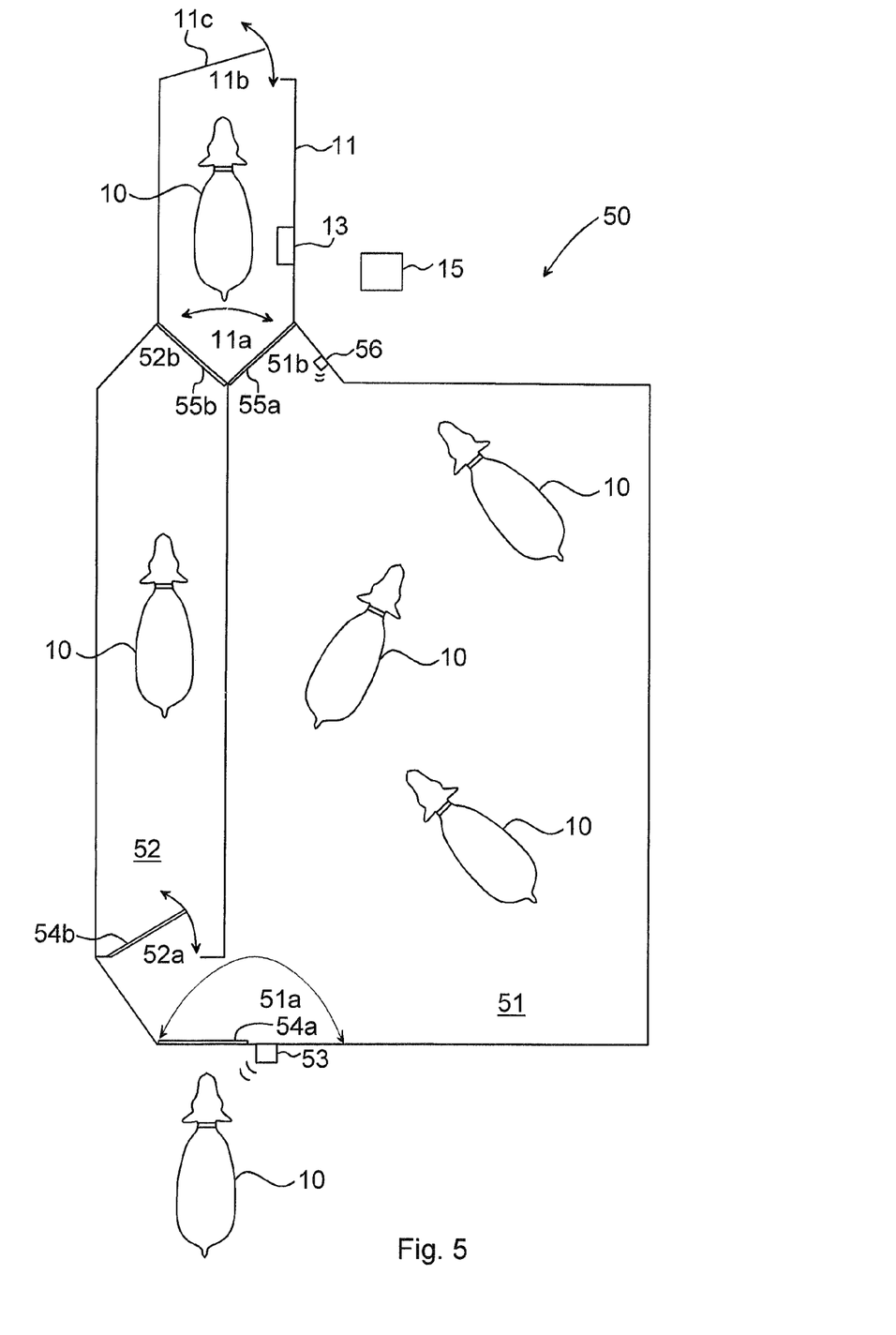

With reference next to FIG. 5 yet another embodiment of the invention will be described. The entrance 11a of a milking stall 11 of the kind described with reference to FIGS. 1-4 is connected to an animal arrangement comprising a waiting area 51 capable of housing a plurality of cows at the time, and a passage way 52, which preferably is narrow to prevent cows from passing one other therein. Each of the waiting area 51 and the passage way 52 has an entrance 51a, 52a in one end of the animal arrangement 50 and an exit 51b, 52b in an opposite end of the animal arrangement 50 leading to the milking stall 11. Gate arrangements 54a-b, 55a-b are provided at the entrances 51a, 52a and the exits 51b, 52b of the waiting area 51 and the passage way 52, the opening and closing of which being controlled by the control device 15. In front of the gate arrangement 54a-b at the entrances 51a, 52a of the waiting area 51 and the passage way 52, and outside the animal arrangement 50, there is provided a cow identification device 50 operatively connected to the control device 15. The gate arrangement 54a-b at the entrances 51a, 52a of the waiting area 51 and the passage way 52 allows each cow to enter either the waiting area 51 or the passage way 52 after having been identified and provided that the cow has milking permission. The gate arrangement 55a-b at the entrances 51b, 52b of the waiting area 51 and the passage way 52 may allow cows to enter the milking stall 11, one at a time, from either one of the waiting area 51 and the passage way 52.

Typically, a cow having a milking suitability index above the milking permission threshold but below a highly suitable threshold is only allowed to enter the waiting area 51, whereas cows having a milking suitability index above the highly suitable threshold are only allowed to enter the passage way 52.

Cows 10 that have entered into the waiting area 51 and have not yet been milked are identified as being housed in the waiting area 51 and similarly, cows that have entered into the passage way 52 and have not yet been milked are identified as being located in the passage way. Based on order of entry, it is also known in which position each cow in the passage way 52 is located.

Various decision algorithms may be applied for deciding whether a cow in the waiting area 51 or a cow in the passage way 52 should have preference to the milking stall 11.

According to one such decision algorithm all cows in the passage way 52 should be allowed entering the milking stall 11 to be milked therein before any cow in the waiting area 51 are admitted to the milking stall 11. In this algorithm the passage way 52 could be referred to as a VIP line.

According to another decision algorithm every second cow admitted to the milking stall 11 comes from the passage way 52 and every second cow admitted to the milking stall 11 comes from the waiting area 51. Since there are generally more cows in the waiting area 51 than in the passage way 52 the mean time a cow has to wait before being admitted to enter the milking stall 11 should be shorter in the passage way 52 than in the waiting area 51.

According to yet another decision algorithm, which may be combined with any of the above decision algorithms, if the milking suitability index for a cow in the waiting area 51 fulfills a given criterion, that is, is above a certain threshold, no cows are allowed to enter the waiting area 51 and optionally the passage way 52, until the cow having the milking suitability index that fulfills the given criterion has entered the milking stall 11.

Further, the waiting area 51 may comprise a cow identification device 56 arranged at the exit 51b of the waiting area 51 and operatively connected to the control device 15. This opens up possibilities to compare the milking suitability indexes for the front cow in the passage way 52 and the cow identified at the exit 51b of the waiting area 51. The cow that is allowed to enter the milking stall 11 in order to be milked therein may be selected according to the FIGS. 1-3 embodiments. This may be interesting even if cows in the passage way 52 generally have higher milking suitability indexes than those in the waiting area 51 since some cows may wait considerable time in the waiting area 51 and as has been disclosed above the milking suitability indexes may be updated frequently, and for some cows the milking suitability index will increase much faster than for others.

According to a modified version of the FIG. 5 embodiment, the passage way 52 and its gate arrangements may be dispensed with. The operation of such modified version is as follows. A milking suitability index is retrieved for each cow that is identified at the entrance 51a to the waiting area. Cows are allowed to enter the waiting area 51 if the milking suitability index for the cow fulfills a milking permission criterion, wherein if the milking suitability index for a cow present in the waiting area 51 fulfills a given criterion, that is, is higher than a certain threshold above the milking permission threshold, the milking permission criterion is made more severe at least until the cow having the milking suitability index that is higher than the certain threshold has entered the milking stall 11. In one version, the milking permission threshold is changed so that no further cows are allowed to enter the waiting area 51 until the cow having the milking suitability index that is higher than the certain threshold has entered the milking stall 11. Hereby, it can be safeguarded that the cow having the milking suitability index that is higher than the certain threshold will be admitted to the milking stall 11 within a limited period of time.

According to another modified version of the FIG. 5 embodiment, the passage way 52 and its gate arrangements may be dispensed with. The operation of such modified version is as follows.

The control device 15 is provided for holding and updating a milking suitability index for each of the cows and the cow identification arrangement 53 is provided for identifying each of the cows at the entrance to the waiting area 51 as being disclosed above. The control device is further provided for keeping track of the cows that enter and leave the waiting area, which advantageously comprises logging the time of each entry and each exit of each of the cows.

When a cow is identified at the entrance to the waiting area 51 the control device 15 is arranged to take a milking allowance decision depending on (i) the milking suitability index for the cow and (ii) cows present in the waiting area and/or on cows that are expected to be identified at the entrance to the waiting area within a selected time period as calculated based on previous data of entries and exits of the cows. If the decision is affirmative the cow is allowed, by means of controlling the gate arrangement 54a, to enter the waiting area 51. The milking allowance decision may depend on the number of cows present in the waiting area 51, on the milking suitability index for one or several cows present in the waiting area, and/or on the milking suitability index for one or several cows that are expected to be identified at the entrance to the waiting area within the selected time period.

In one exemplary version a maximum number of cows, e.g. eight cows, are allowed to be present simultaneously. If a cow is identified at the entrance to the waiting area 51 when the number of cows in the waiting area 51 is less than half the maximum number, that is in the example four cows, the cow is allowed to enter the waiting area 51, optionally only if the cow in some sense is qualified for milking. If a cow is identified at the entrance to the waiting area 51 when the number of cows in the waiting area 51 is more than half the maximum number, the cow is allowed to enter the waiting area 51 only if the cow has a high milking suitability index, i.e. a priority to be milked, compared to those of the cows that are expected to be identified at the entrance to the waiting area 51 within the selected time period. A high milking suitability index in this context may be considered to be a higher milking suitability index than each of the milking suitability indexes of the cows expected to be identified at the entrance to the waiting area 51 within the selected time period. Alternatively, a high milking suitability index may be considered to be a milking suitability index comparable to the highest milking suitability index of the cows expected to be identified at the entrance to the waiting area 51 within the selected time period.

According to still another version of the FIG. 5 embodiment, the passage way 52 may be exchanged for a second waiting area 51 similar to the waiting area 51, wherein cows having different milking suitability indexes are collected in different waiting areas.

Still further, the embodiments of FIGS. 4 and 5 may be combined so that there are one waiting area and two passage ways that may be entered by the cows in order to walk to the milking stall in order to be milked therein. Cows having different milking suitability indexes are collected in different ones of the waiting area and the two passage ways.

A person skilled in the art may readily obtain further embodiments falling within the terms of the appended patent claims by combining features of the embodiments described above.

It shall be appreciated by a person skilled in the art that the entrances of the booths of the FIGS. 1-3 embodiments, of the passage ways of the FIG. 4 embodiment, and of the animal arrangement of the FIG. 5 embodiment may be accessible only from a feeding area.

It shall further be appreciated, that the cows may have access to water, and optionally solid feed such as concentrate, in the booths, passage ways, and waiting areas of the different embodiments.

Turning now to the milking suitability index for each of the cows, an overview of how the milking suitability index can be formed and updated will be disclosed. The milking suitability index may be affected by a large number of factors that are given different weights depending on the importance of the factors.

Generally, the milking suitability index will depend on a time T lapsed since the cow was milked last time compared to a mean milking interval for the cow. For instance, if a cow has a mean milking interval M of 10 hours and obtains milking permission 6 hours after previous milking, it is most suited to be milked after 10 hours. The cow will therefore be given a relatively low milking suitability index after 6 hours, which will increase with time, and become high to very high when 10 hours have past without the cow having been milked again. Before 6 hours after previous milking the cow has no milking permission and is preferably led away from the milking area if approaching the same.

Another factor to consider in a dairy farm where an exit from a feeding area leads to the milking system is the time elapsed from that the cow left a feeding area last time until it leaves the feeding area again, this time being indicated by FoFo. This is because when a cow leaves the feeding area before the mean milking interval for the cow has elapsed since previous milking, an opportunity to guide the cow to the milking system is at hand, and whether it should be guided to the milking system or not may depend on the time FoFo. This time may be averaged over several milking cycles to obtain a better expected measure of the time, at which the cow next time will leave the feeding area. If the time the cow in average stays at the feeding area can be measured, it can be foreseen when a cow is to leave the feeding area and this may be taken into account as a factor.

Another factor to consider is the time the cow usually waits in a pre-milking waiting area before being allowed to enter the milking stall, this time being indicated by TV.

A rough estimate of a milking suitability index MSI could be $MSI=(T+FoFo+TV)/M$ However, there are many more factors that may affect the milking suitability index. The following factors may be considered.

A health parameter of the cow may be considered, for instance lameness or a hoof or leg injury of the cow. An injured cow may suffer from waiting a long period of time before being admitted to the milking stall, and thus its milking suitability index should be increased. This injury may be entered manually into the control device so it can take the injury into account when updating the milking suitability index for the cow.

The milking suitability index for a cow that recently has had mastitis should be increased. The more times the cow has had mastitis, the more should the milking suitability index be increased.

The cell count value in milk from a previous milking of the cow may be considered. The higher the cell count is the higher is the risk the cow has an udder inflammation. This may be treated by means of milking the cow frequently. Thus, a high cell count value in milk from a cow should increase the milking suitability index for the cow. Similarly, a higher conductivity value of milk from a cow should increase the milking suitability index for the cow.

The color of milk from a previous milking of a cow may be considered. If the color is yellowy, reddish, or pinkish, the milking suitability index for the cow should be increased.

The hierarchic order of the cow may be considered. Cows with low hierarchic order have typically to wait a considerable time before entering the milking stall. This means that the normal mean milking interval may be longer than the cow actually wants to. Often the approximate hierarchic order of the cows is known to a dairy farmer. Therefore, the dairy farmer may enter this information into the control device so it can take the hierarchic order of the cows into account when updating the milking suitability indexes for the cows. Consideration may be taken to the number of cows waiting in a pre-milking waiting area since the larger the number is, the more importance has the hierarchic order of the cows. The hierarchic order of the cow may be established automatically, e.g. by means of the methods disclosed in our pending PCT application No. PCT/SE2006/001455 filed on Dec. 20, 2006.

The time lapsed since the cow gave birth to a calf last time may be considered. The first week after the cow has given birth to a calf, it has a low hierarchic order, which increases with time. The milking suitability index should thus be increased during the first time after giving birth. This information may be entered manually into the control device so it can take the information into account when updating the milking suitability index for the cow.

The number of days in lactation may be considered. In the beginning of lactation, the cow should be milked more often than in the end of lactation. Thus, the milking suitability index should decrease with the number of days in lactation.

Expected milk yield for the cow may be considered. The larger the expected milk yield is, the more should the milking suitability index be increased.

The milking result for the cow last time the cow was milked may be considered. If the cow was not completely milked out during the previous milking, the milking suitability index should be increased.

The milking suitability index for each of the cows may also be capable of being updated manually, in particular capable of being set to a value corresponding to a highest possible value, that is, to the highest priority for being milked.

The milking suitability index as being described above may be used to control access to other locations than the milking stall. For instance, milking suitability index may be used to control access to feeding stations, pastures, and other areas.

Alternatively, other indexes are formed, updated, and used to control access to different locations, stations, and areas.

It shall be appreciated that the present invention may be implemented in other milking systems than those described in the present description. The requirements on the milking system are specified in the respective appended claim.

Similarly, alternative gate arrangements, decision algorithms, and milking suitability indexes may be used with the present invention.

The invention claimed is:

1. A method for managing milking animals, the method comprising:
   determining milking suitability indexes for milking animals approaching a first or a second booth;
   comparing the milking suitability indexes against an independent suitability threshold;
   permitting only milking animals having determined milking suitability indexes above the suitability threshold to enter the first and the second booth;
   comparing a milking suitability index of a first milking animal in the first booth and a milking suitability index of a second milking animal in the second booth against each other;
   permitting one of the first and the second milking animal with a more milking-suitable of the compared milking suitability indexes to exit the respective first or second booth and enter a milking stall to be milked by a milking apparatus; and
   retaining the other of the first and the second milking animal with a less milking-suitable of the compared milking suitability indexes within the respective first or second milking booth.

2. The method of claim 1, wherein the determining milking suitability indexes includes,
  identifying the milking animals approaching the first or the second booth, and
  calculating a milking suitability index corresponding to the identified animal.

3. The method of claim 2, wherein each of the milking animals has a corresponding independent suitability threshold calculated from unique criteria, and wherein the permitting includes permitting only milking animals having determined milking suitability indexes above the corresponding independent suitability threshold to enter the first and the second booth.

4. The method of claim 2, wherein the milking suitability indexes are calculated based on at least one of a time interval since the identified milking animal was previously milked, a time interval since the identified milking animal left a feeding area, a median time interval for the identified milking animal to wait in a waiting area before being milked, an average time interval for the identified milking animal to wait between milkings, a health parameter of the identified milking animal, a hoof or leg injury of the identified animal, a cell count value of milk from the identified milking animal, a conductivity value of milk from the identified milking animal, a color of milk from the identified milking animal, a hierarchic order of the identified milking animal, a time interval since the identified milking animal most recently gave birth to a calf, a number of days the identified milking animal has been in lactation, an expected milk yield for the identified milking animal, and a milking result for the identified milking animal from a previous milking.

5. The method of claim 1, wherein the permitting one of the first and the second milking animal to exit the respective-first or second milking booth and enter a milking stall to be milked by a milking apparatus includes opening a gate directly between only the respective first or second milking booth and the milking stall.

6. The method of claim 1, wherein the first and the second booths are sized to house only one milking animal, and wherein only a single milking animal is permitted to enter or exit each of the first and the second booths at a time.

7. The method of claim 1, wherein the first and the second booths are each sized to house a plurality of the milking animals in a single-file manner, so that the milking animals may not change order in the booths.

8. The method of claim 1, wherein,
  the first booth is a waiting area sized to house a plurality of the milking animals in several directions so that the milking animals in the waiting area may re-order themselves, and
  the second booth is sized to house a plurality of the milking animals in a single-file manner, so that the milking animals in the second booth may not change order.

9. The method of claim 8, further comprising:
  comparing the milking suitability indexes against a high-suitability threshold;
  permitting only milking animals having determined milking suitability indexes above the high-suitability threshold to enter only the second booth; and
  permitting only milking animals having determined milking suitability indexes above the suitability threshold and below the high-suitability threshold to enter only the first booth.

10. The method of claim 9, wherein the comparing the milking suitability indexes of a first milking animal in the first booth and a second milking animal in the second booth against each other includes comparing the milking suitability of the first milking animal approaching the milking stall in the waiting area and the second milking animal being at a front of a line in the second booth.

11. The method of claim 9, further comprising:
  prohibiting any further milking animals from entering the first booth until a predetermined milking animal in the first booth enters the milking stall.

12. The method of claim 1, wherein the independent threshold is calculated based on at least one of a presence of the milking animal in the first booth and a presence of the milking animal in the second booth.

13. The method of claim 1, further comprising:
  feeding the milking animals; and
  directing the milking animals to the first or the second booth directly after the feeding.

14. The method of claim 1, further comprising:
  increasing milking suitability of the other of the first and the second milking animal retained in the respective milking booth, the increasing being based on a time that the other of the first and the second milking animal is retained in the respective first or second milking booth.

* * * * *